United States Patent

Moncisvais et al.

[11] Patent Number: 5,999,677
[45] Date of Patent: Dec. 7, 1999

[54] OPTICAL FIBER CABLE

[75] Inventors: Raul Ugalde Moncisvais; Jose Ramon Franco Ponce, both of Querétaro Qro., Mexico

[73] Assignee: Servicios Condumex S.A. DE C.V., Queretaro, Mexico

[21] Appl. No.: 08/887,701

[22] Filed: Jul. 3, 1997

[30] Foreign Application Priority Data

Jul. 4, 1996 [MX] Mexico ..................................... 962631

[51] Int. Cl.$^6$ ........................................................ G02B 6/44
[52] U.S. Cl. .......................... 385/113; 385/109; 385/103; 385/110; 385/111; 385/112; 264/1.24
[58] Field of Search .................................... 385/109, 103, 385/110, 111, 112, 113; 264/1.24

[56] References Cited

U.S. PATENT DOCUMENTS

| | | | |
|---|---|---|---|
| 4,230,395 | 10/1980 | Dean et al. | 385/109 |
| 4,828,352 | 5/1989 | Kraft | 385/109 |
| 5,050,957 | 9/1991 | Hamilton et al. | 385/113 |
| 5,630,003 | 5/1997 | Arroyo | 385/113 |

*Primary Examiner*—Rodney Bovernick
*Assistant Examiner*—Sung T. Kim
*Attorney, Agent, or Firm*—Carmen Pili Curtis

[57] ABSTRACT

The invention relates to a method of preparing an improved cable and an improved optical fiber cable comprising a central reinforcement member and a plurality of loose tubes as laying elements, placed longitudinally around the central reinforcement member. The loose tubes comprising at least one or more optical fiber filaments. A gel filling material is contained in both the inner section as well as the outer section of the loose tubes. A layer encircling the assembly is selected from the group consisting of an aramide fiber layer, a fiber glass and combination thereof. At least one or more plastic cover is placed longitudinally over the fiber layer to support metal ribbons which are peripherally incorporated to the assembly and a second layer of plastic cover is placed over the metal ribbon.

19 Claims, 1 Drawing Sheet

OPTICAL FIBER CABLE

BACKGROUND OF THE INVENTION

Presently different techniques are known to produce a variety of optical fiber cables for telecommunication purposes. Through these optical elements it is possible to establish a physical link among telephone, computer, telecontrol and similar telecommunication centers. Said telecommunication is performed through electronic signals and based on bundles of light rays.

The abovementioned optical fiber filaments are small, with diameters usually smaller than one millimeter. It is convenient to give them adequate protection to use them over long distances. One type of protection which is already in use is what is called an adhered type protection, which is obtained through the extrusion of a plastic or similar material on and in direct contact with said filaments.

The optical cables typically use optical fibers with an adhered fiber protection, as laying elements. In Mexican Patent No. 159491 improvements to said cable are presented, said improvements are characterized because they use loose tubes as laying elements. These loose tubes, in turn, are characterized because they are a protection for one or several optical fiber elements contained within said tubes. Said tubes are also characterized because they contain the filaments, alone or together with a filling material for the protection of the filaments against possible moisture penetration inside the tube.

Dry tubes are tubes which do not contain a filling material and filled tubes are tubes that contain said filling material. In turn, said filling material is characterized because it has a consistency that protects the filaments, is moisture repellent and allows at the same time the movement of said filaments within the tubes.

The improvements to the optical cable are also characterized because the (dry or filled) loose tubes are laid through their unidirectional or bidirectional helicoidal application around a central traction element. This central traction element is characterized because it is used for pulling the optical cable during its installation. Said traction element is also characterized because it has a breaking load capable of withstanding the weight and tension of a continuous (without unions) and finite length of optical cable during the installation. The loose tubes are kept on the central element through the application on said loose tubes of a union element. On this assembly, one or two plastic covers are extruded, under which metal ribbons are to be found, longitudinally placed for the mechanical protection of the optical cable of the present invention.

The applicant has developed an optical fiber cable that improves the previous qualities through a new manufacturing technique.

The improvements to the optical cable are based on a loose tube type construction, said loose tubes are laid in an unidirectional or bidirectional (sz) helicoidal form around a light central element with low mechanical memory. This central element constitutes a traction element when the cable is submitted to tension forces caused by the installation; and an element that balances the expansion and contraction forces caused by the operation of the cable at the limits of the thermal range.

On the core formed by the central element and the loose tubes, an aramide fiber layer or a fiber glass layer is placed which, together with the central element, contributes to reach a higher tension during the installation process. On said assembly one or several plastic covers are applied, said covers support one or two metal ribbons placed longitudinally. As final protection, another plastic cover is applied.

Figure 1:
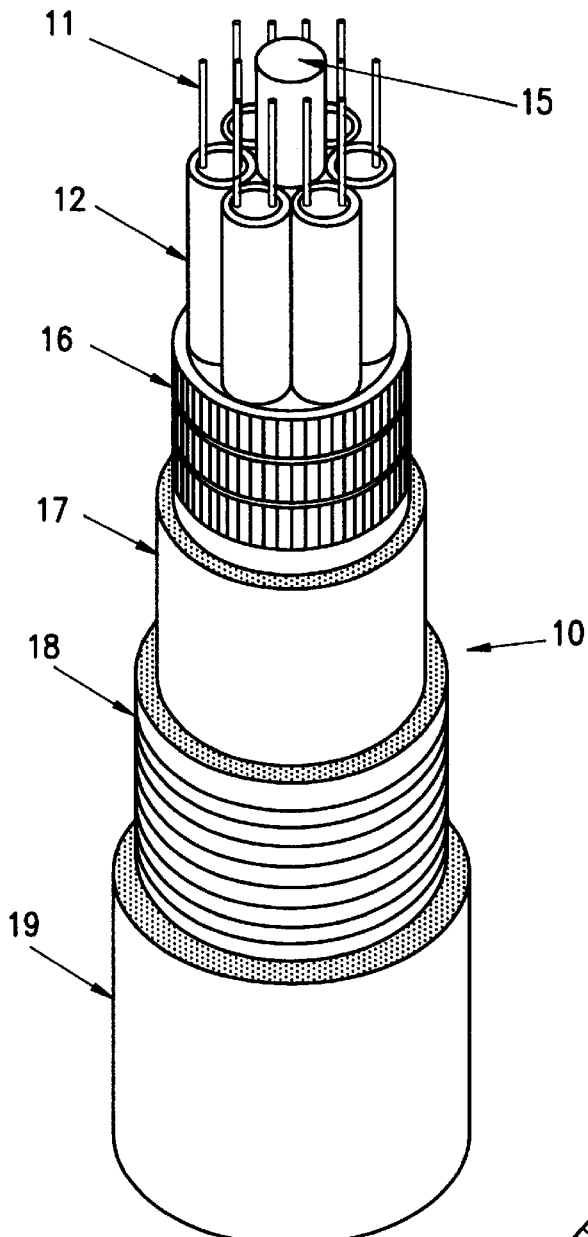
FIG. 1 corresponds to a perspective view of an improved optical fiber cable for telecommunication, showing tile loose tube (12) for optical fibers (11) with a central pultruded reinforcement (15).
Figure 2:
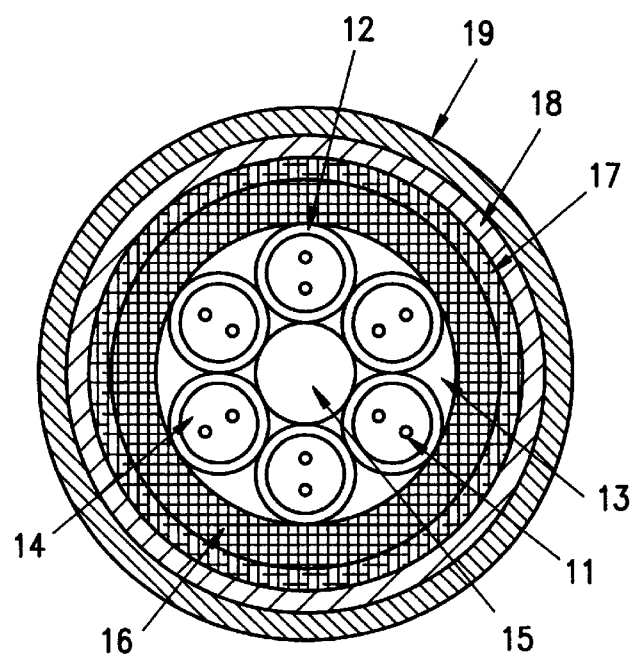
FIG. 2 corresponds to a cross section of all improved optical fiber cable of FIG. 1.

Hereinafter the invention will be described according to the drawings of FIGS. 1 and 2 in order to better explain said invention but without restricting its scope.

DETAILED DESCRIPTION OF THE INVENTION

The present invention describes and claims the improvements to a telecommunication optical cable that contains one or several optical fiber filaments. Said filaments are used as physical linking means for electronic communication, based on bundles of light rays, among information, signalization, television and similar telecommunication centers.

The optical fiber cable 10 consists of a plurality of loose tubes 12 placed longitudinally around a pultruded central reinforcement 15, the optical fiber filaments 11 being inserted inside the loose tubes.

The optical fiber filaments are usually manufactured with a primary acrylate protection, reaching a final diameter of 0.25 millimeters. A secondary protection type proposed for such filaments is the application through extrusion of a plastic cover in direct contact with the filaments. Said secondary protection type can be identified as adhered type protection. Generally, optical fiber cables have been manufactured using adhered protection fibers, helicoidally laid around a central element.

The alternative method for secondary protection which is presented here is the confinement of one or several optical fiber filaments within a plastic tube. With the adequate selection of the tube inside diameter, the optical fibers do not directly receive external stress. Because said filaments have some freedom of movement inside the tubes, this type of secondary protection can be identified as loose type protection.

To the assembly of loose tubes and central reinforcement, a layer of aramide fiber or fiber glass 16 is applied, and then a second polyethylene cover 17. The assembly coated in this way includes a protection consisting of one or several metal ribbons 18 and is finally covered by a polyethylene cover 19. The metal ribbon corresponds to a steel truss it least 0.15 mm thick with both sides covered with a plastic material of the second cover. This steel ribbon is transversely corrugated along its length and is longitudinally placed on the first cover, covering said first cover and overlapping upon itself by at least 3 mm.

This width should be calculated with regard to the outside diameter of the first cover and taking into account the virtual increase of the same because of the corrugations of the steel ribbon. File corrugations of the abovementioned steel ribbon are made in order to give the optical cable the adequate flexibility.

The improvements to the herein described optical cable are characterized because said cable contains one or several optical fibers 11, inside one or several loose tubes 12. The inside diameter of the tube 12 is calculated based on the parameter denominated total movement margin which establishes a relationship between the free movement space of one or several fibers and the angle with which the tubes are placed around the central reinforcement and is equal to the traction margin+compression margin. The outside diameter is determined based on the mechanical stress that tile tube must withstand and according to the material type used in its manufacture. The materials can be elastomeric thermoplastic polymers or polyamides and any of them may or not contain fluorine or chlorine in order to prevent flame propagation or to make them resistant to certain solvents.

The manufacture of the loose tubes 12 is carried out with an extruder through the process known as tubulation. Each fiber filament 11 is controlled through a motorized uncoiling device with electronic feedback in order to keep a constant tension during the tabulation process. The fiber or fiber assembly reaches the extrusion head where they are guided to the outside through a capillary tube with two different diameter sections divided by a filling material injector. The difference between the diameters of the capillary tube causes a pressure in the line direction that prevents turbulences in the gel 13, 14 filling material from affecting the process. The capillary tube reaches the exit of the extruding guide where it penetrates into the inside part of the tube placing the optical fibers and the filling material within the tube. Finally, the tube passes through cooling water troughs before reeling.

The filling material is an hydrophobic flooding gel adequate to prevent moisture penetration inside the tubes. Said gel is thixotropic and maintains a viscosity which is adequate to prevent undesirable runoffs and hardening within the operation temperature range of the cable, which varies from −40 to 85° C. This material must be compatible with the materials with which it is in contact during the operation of the cable. The filling material is pumped from its original container to the degasifying chamber where the air trapped within the material is liberated. From this point, the material is pumped to the extrusion head through a gear pump under constant pressure. The final part of the stretch is constituted by a heating coil in order to insure an homogeneous material temperature when the material enters the extrusion head.

Because of the thermomechanical characteristics of the plastic material, it is important to control the shrinkage that the tube may present during the manufacturing process. In this way, the length of the optical fiber placed inside the tube is kept under control. Said length is known as fiber excess, a parameter which is essential in order to insure a good cable operation in the conditions for which it was designed. The present invention contemplates three different means to reach said control. The first means is constituted by the tube stretching index, and is based on a proportional ratio between the tube final dimensions and the dimensions of the tools used for its manufacture. The second means is constituted by the control of the optical fiber and uncoiling tensions, of the tube coiling tensions and of the temperatures of the cooling troughs. Lastly, the most important means is a pulley located in the first part of the cooling trough that compensates possible process variations due to the sliding of the point where the fibers are inserted into the tube, said sliding being of a few tenths of a millimeter. Said pulley is known as congruence pulley and can be static or dynamic according to the physical characteristics of the cooling trough.

The tubes are laid around a low weight, high stress resistance and low mechanical memory central reinforcement 15. Said characteristics give the cable a better performance in its operation. The central reinforcement can be covered in its periphery with a plastic material in order to increase its diameter if it is so required by the design. The use of metal reinforcements is not contemplated because of their high mechanical memory.

We claim:

1. An improved optical fiber cable for telecommunications, comprising:
   a) a central reinforcement member;
   b) a plurality of loose tubes as laying elements, placed longitudinally around said central reinforcement member in order to form a pultruded tubulated assembly; said loose tubes comprising at least one optical fiber filament being free to move with respect to said loose tube and are held together in a side by side relation; said loose tubes being laid with respect to the central reinforcement member in a unidirectional helicoidal or bidirectional (sz) hellicoidal form;
   c) a gel filling material contained in both the inner section as well as the outer section of the loose tubes;
   d) a layer encircling said tubulated assembly; said layer selected from the group consisting of an aramide fiber layer, a fiber glass layer and combinations thereof to obtain better tension during cable installation;
   e) at least one plastic cover placed longitudinally over said layer to support at least one metal ribbon which is peripherally incorporated to the assembly;
   f) at least one corrugated metal ribbon surrounding and enclosing said plastic cover; and
   g) a second layer of plastic cover over said metal ribbon.

2. The improved optical fiber cable according to claim 1, wherein the central reinforcement member is a light element with low mechanical memory.

3. The improved optical fiber cable according to claim 1, wherein the central reinforcement member comprises:
   a) a traction element when the cable is submitted to stress caused by the installation; and
   b) a balancing element which balances the expansion and contraction forces caused by the operation of the cable at the limits of its thermal range.

4. The improved optical fiber cable according to claim 1 wherein the gel filling material is hydrophobic and thixotropic.

5. The improved optical fiber cable according to claim 1 wherein the said loose tubes are made of a material selected from the group consisting of thermoplastic polymer, polyamide, fluorine or chlorine containing thermoplastic polymer, fluorine or chlorine containing polyarnide and mixtures thereof.

6. The improved optical fiber cable according to claim 5 wherein the plastic cover of (e) and (g) is polyethylene.

7. An improved optical fiber cable according to claim 1 prepared by a process comprising:
   a) extruding at least one or more loose tubes through tubulation;
   b) controlling said optical fiber filaments by a motorized unwinding device with electronic feedback to keep a constant tension during the tubulation process.

8. The improved optical fiber according to claim 7, further comprising guiding the fiber or fiber assembly from an extrusion head to an inner part through a capillary tube having two different diameter sections divided by a filling material injector such that the difference between the two diameters of the capillary tube causes a pressure in the line direction preventing the filling material from having turbulences affecting the process.

9. The improved optical fiber cable, according to claim 7, wherein the capillary tube reaches the exit of the extrusion guide where it penetrates into the inner part of the tube, placing the optical fiber and filling material inside the tube and then reaching the water cooling troughs.

10. The improved optical fiber cable, according to claim 7, further comprising compensating for the shrinking of the loose tubes by an optical fiber excess, said optical fiber excess being controlled by factors selected from the group consisting of tube stretching index; fiber unwinding tensions, tube winding tensions and cooling temperatures and a static or dynamic congruence pulley located in the cooling trough.

11. The improved optical fiber cable according to claim 7 wherein the optical fiber excess is controlled by the static or dynamic congruence pulley to compensate the process variations caused by the sliding of the point where the fibers are inserted into the tube, said sliding at least about a few tenths of a millimeter.

12. A method of preparing an improved optical fiber for telecommunication comprising the steps of:
   (a) providing a plurality of loose tubes as laying elements, placed longitudinally around a central reinforcement member in order to form a pultruded tubulated assembly;
   said loose tubes comprising at least one or several optical fiber filaments being free to move with respect to said tubes and are held together in a side by side relation;
   (b) flowing a gel filling material in both the inner section as well as the outer section of the loose tubes;
   (c) depositing a layer encircling said tubulated assembly; said layer selected from the group consisting of an aramide fiber layer a fiber glass layer and comdinations thereof to obtain better tension during cable installation;
   (d) depositing at least one or several plastic cover longitudinally over said layer to support metal ribbons which are peripherally incorporated to the assembly;
   (e) depositing at least one or several corrugated metal ribbons surrounding and enclosing said plastic cover; and
   (f) adding a second layer of plastic cover over said metal ribbon.

13. The method according to claim 12, wherein the central reinforcement member is a light element with low mechanical memory.

14. The method according to claim 12, further comprising extruding the loose tubes through tubulation and controlling the optical fiber filaments by a motorized unwinding device with electronic feedback to keep a constant tension during the tubulation process.

15. The method according to claim 12, further comprising penetrating into the inner part of a capillary tube as the tube reaches the exit of the extrusion guide, placing the optical fiber and filling material inside the tube and reaching the water cooling troughs.

16. The method according to claim 12, further comprising compensating for shrinking of the loose tube by an optical fiber excess, said optical fiber excess being controlled by factors selected from the group consisting of tube stretching index; fiber unwinding tensions, tube winding tensions and cooling temperatures; a static or dynamic congruence pulley located in the cooling trough.

17. The method according to claim 16 wherein the optical fiber excess is controlled by the static or dynamic congruence pulley to compensate the process variations caused by the sliding of the point where the fibers are inserted into the tube, said sliding at least about a few tenths of a millimeter.

18. The method according to claim 12, further comprising guiding the fiber or fiber assembly from the extrusion head to the inner part through a capillary tube with two different diameter sections divided by a filling material injector; the difference between the two diameters of the capillary tube causing a pressure in the line direction which prevent the filling material from having turbulences affecting the process.

19. The improved optical fiber cable according to claim 1 wherein the optical fiber filament comprises primary acrylate protection.

* * * * *